US006994884B1

(12) United States Patent
Guan et al.

(10) Patent No.: US 6,994,884 B1
(45) Date of Patent: Feb. 7, 2006

(54) HIGH PERFORMANCE FUEL CELL ELECTRODE AND METHOD FOR MANUFACTURING SAME

(75) Inventors: Jie Guan, Torrance, CA (US); Dacong Weng, Rancho Palos Verdes, CA (US); Vishal Agarwal, Redondo Beach, CA (US); Xiwang Qi, Torrance, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/012,259

(22) Filed: Dec. 16, 2004

(51) Int. Cl.
*B05D 5/12* (2006.01)
*B44C 1/22* (2006.01)

(52) U.S. Cl. .................. 427/115; 427/282; 427/309; 216/13; 216/40; 216/41; 216/74; 216/95; 216/101

(58) Field of Classification Search ............... 427/115, 427/282, 309; 216/13, 40, 41, 52, 74, 76, 216/95, 101
See application file for complete search history.

(56) References Cited

U.S. PATENT DOCUMENTS

| 6,228,521 B1 * | 5/2001 | Kim et al. ................. 429/33 |
| 6,436,565 B1 * | 8/2002 | Song et al. ................ 429/31 |
| 6,653,009 B2 * | 11/2003 | Wang et al. ............... 429/30 |
| 6,663,999 B2 * | 12/2003 | Van Berkel et al. ......... 429/45 |

* cited by examiner

*Primary Examiner*—Brian K. Talbot
(74) *Attorney, Agent, or Firm*—Nixon & Vanderhye P.C.

(57) ABSTRACT

A method of fabricating a support electrode for a solid oxide fuel cell includes (a) providing a solid support electrode having an upper surface, the solid electrode comprising an electronically non-conductive material and an electronically conductive material; (b) applying a mask over the upper surface to create a desired unmasked pattern on the top surface; (c) removing the desired amount of material(s) from the unmasked pattern to a predetermined depth of the support electrode; and (d) removing the mask.

13 Claims, 3 Drawing Sheets

HIGH PERFORMANCE FUEL CELL ELECTRODE AND METHOD FOR MANUFACTURING SAME

BACKGROUND OF THE INVENTION

This invention relates to the manufacture of high performance solid oxide fuel cells (SOFCs), and, particularly to fabrication methods for electrode-supported fuel cells.

A fuel cell is a device which electrochemically converts chemical energy into electricity. Currently, there are two basic cell constructions for solid oxide fuel cells: electrolyte-supported cells and electrode-supported cells. In certain planar SOFC's with electrolyte-supported cells, the electrolyte is the mechanical support structure of the cell, with a thickness typically between 150 and 250 µm. In electrode-supported cells, the support electrode provides an electrical flow path, mass transport, and mechanical strength. Generally, the features and/or characteristics of the SOFC support electrode include an electrically conductive component, an oxide ion conducting component, and porosity. In addition, the support electrode has considerable thickness in order to provide the required cell flatness and mechanical strength. In SOFCs of this type, the electrolyte is comprised of a thin film, 50 µm or thinner, and is formed on the support electrode. Tubular, segmented-cells-in-electrical-series, and certain planar SOFC designs employ this type of cell. The use of a thin electrolyte in electrode-supported cells reduces the ohmic losses in the cells. Challenges remain, however, in improving electrochemical and mechanical performance of the support electrode.

U.S. Pat. No. 6,228,521 discloses an improved method for producing a high performance SOFC having a graded or multi-layered, relatively thick anode. More specifically, a Ni and YSZ anode is fabricated such that a major layer initially has about 80% by volume of NiO and a minor layer initially has about 60% volume NiO. The invention permits the use of thicker and thus stronger anodes without sacrificing electrochemical performance. Although the high amount of NiO in the major layer is preferred for the benefit of sufficient electronic conduction and porosity, fabrication of this configuration is problematic for large and flat cells because of a coefficient of thermal expansion (CTE) mismatch between NiO and YSZ. Further, the large volume of Ni in the anode after reduction could potentially cause anode creeping/sintering under high operating temperatures.

U.S. Pat. No. 5,270,536 discloses a method of fabricating a solid oxide fuel cell electrode, and in particular the anode. The method comprises forming a micro-composite element comprising a layered pattern of electrical conductive tape; creating a plurality of micro-composite subelements from the micro-composite element, each microcomposite subelement having the layered pattern; and juxtaposing at least two of the microcomposite subelements such that the layered patterns of adjacent microcomposite subelements are in different orientations relative to one another. The network formed with the subelements in the anode tape minimizes the randomness of anode components to thereby maximize electrical connectivity. According to the patent disclosure, the conductive network can also strengthen the overall structure of the anode while preventing dimensional changes that might otherwise occur during the anode reduction. Greater strength is achieved by virtue of the electrolyte network within the anode structure. One of the challenges of this method is to effectively control and keep the subelements in the desired order, as they are vulnerable to distortion forces during the manufacturing process.

World patent application WO02/058169 discloses an SOFC capable of being operated with sulfur-containing hydrocarbon fuel, as well as methods of fabrication of such fuel cells. One of the key features is the replacement of Ni in the conventional anodes with Cu- and ceria-containing materials. In order to generate enough porosity in the support anode structure so that it can be efficiently impregnated with catalyst materials, the anode structure made of NiO/YSZ is first reduced to Ni/YSZ and then refluxed with $HNO_3$ to leach out the Ni. The resultant YSZ skeleton is then impregnated with catalysts such as Cu and ceria for sulfur-containing hydrocarbon fuel to avoid carbon deposition. However, the impregnation is often insufficient to supply adequate electrical flow paths.

In electrode-supported fuel cells, the support electrode needs a minimum thickness to provide sufficient mechanical strength. Generally, the thicker the support electrode, the stronger the cell. However, the cells with a supported electrode usually show bowing/non-flatness due to CTE mismatch and sintering shrinkage mismatch of electrode and electrolyte components. In electrode-supported SOFCs, thicker support electrodes improve the cell flatness. On the other hand, the thicker support electrodes could restrict mass transport through the electrode, e.g., limiting the oxygen transport in the support cathode or fuel/product transport in the support anode. The limitation on mass transport has a significant impact on fuel cell efficiency, as the concentration polarization will greatly reduce the fuel cell performance at high fuel and/or air utilization. Potential approaches to reduce the concentration polarization in the support electrode include:

Increasing the porosity in the support electrode;

Reducing the thickness of the support electrode; and

Designing and optimizing the pore/component structure of the support electrode.

BRIEF DESCRIPTION OF THE INVENTION

The current invention provides novel design and fabrication methods for high performance SOFC support electrodes. Instead of random microstructure and porosity found in conventional support electrodes, the support electrode structure here provides controlled directionality and connectivity of electrode components for improved electrochemical performance. Also, the supported electrode can be substantially thick to provide sufficient mechanical strength and desired cell flatness without sacrificing cell electrochemical performance. In one exemplary embodiment, the support electrode is made by initially fabricating the electrode in accordance with known processes. In the exemplary embodiment of this invention, the electrode may be comprised of two layers of zirconia-nickel (or nickel oxide) material including a relatively thick upper layer and a relatively thin lower layer, the thick upper layer having a porosity no less than the thin lower layer. The next fabricating step includes masking the outer surface of the upper support electrode layer for design patterns, followed by etching out one of the support electrode materials, i.e., nickel (or nickel oxide), or etching out both materials, and then removing the mask. In the unmasked areas, the etching process will produce features where nickel (or nickel oxide)

is etched out leaving zirconia, or produce features where both nickel (or nickel oxide) and zirconia are physically etched out leaving empty spaces.

Depending on the pattern achieved in the upper layer, the gas channels in the interconnect that will overlie the support electrode can be made to align with the unmasked area (e.g., zirconia-only pattern or empty space) in the support electrode while the electrical conduction paths in the interconnect (e.g., ribs or dimples) align with the masked pattern containing nickel.

Accordingly, in its broader aspects, the invention relates to a method of fabricating a support electrode for a solid oxide fuel cell comprising (a) providing a solid support electrode having an upper, planar surface, the solid electrode comprising an electronically non-conductive material and an electronically conductive material; (b) applying a mask over the upper surface to create a desired unmasked pattern on the top surface; (c) removing a desired amount of material(s) from the unmasked pattern to a predetermined depth of the support electrode; and (d) removing the mask.

In another aspect, the invention relates to a method of fabricating a support electrode for a solid oxide fuel cell comprising (a) providing a solid support electrode having a first electrically conductive layer with an outer surface and a second electrically non-conductive layer underlying said first electrically conductive layer, said first layer being thicker than said second layer; (b) applying a mask over the upper surface to create a desired unmasked pattern on the top surface; (c) removing a desired amount of material(s) from the unmasked pattern to a predetermined depth of the first electrically conductive layer of the support electrode; and (d) removing the mask.

The invention will now be described in connection with the drawings identified below.

DETAILED DESCRIPTION OF THE INVENTION

Figure 1:
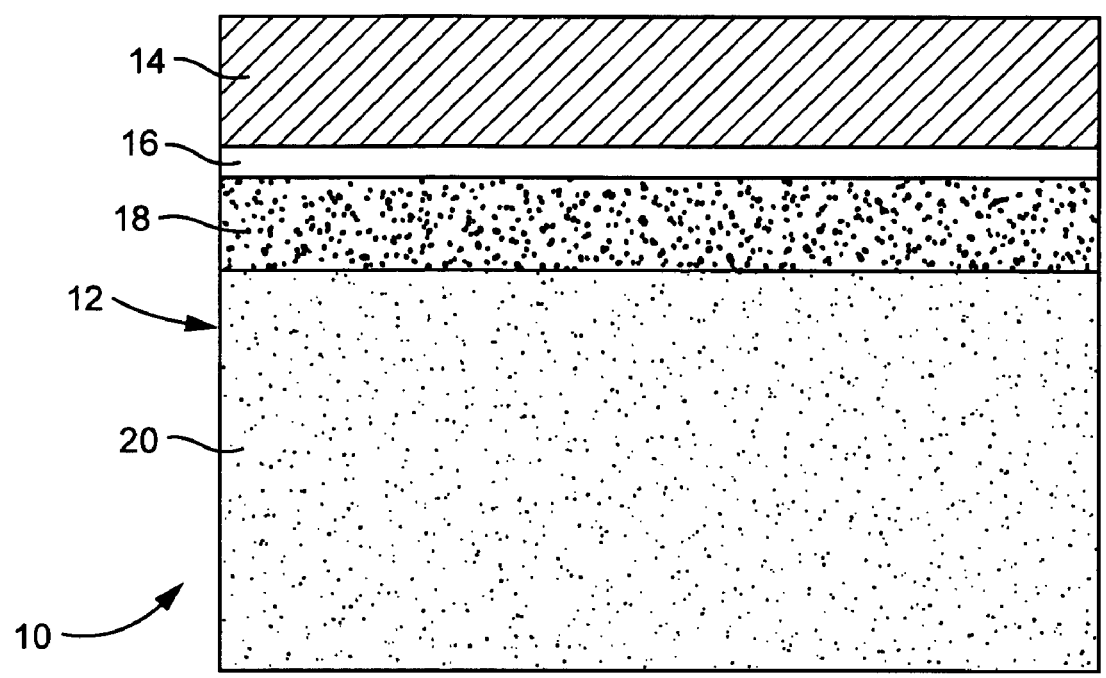
FIG. 1 is a FIG. 1 is a cross-sectional view through a typical electrode-supported solid oxide fuel cell.

FIG. 1 illustrates a conventional single SOFC 10 for incorporation into an SOFC stack. The cell 10 includes a graded anode 12 and a cathode 14 sandwiched about an electrolyte 16. The electrolyte contacts the cathode 14 and a first adjacent layer 18 of the anode. A second and thicker anode layer 20 engages the other side of the first anode layer 18. The anode 12 may be comprised of nickel and YSZ (yttria stabilized zirconia). The anode 12 is fabricated so that the first anode layer 18 has about 60% by volume of NiO and the second anode layer 20 has about 80% by volume of NiO. The second anode layer 20 also has a greater porosity that enables easier transport of the reactive gases.

Figure 2:
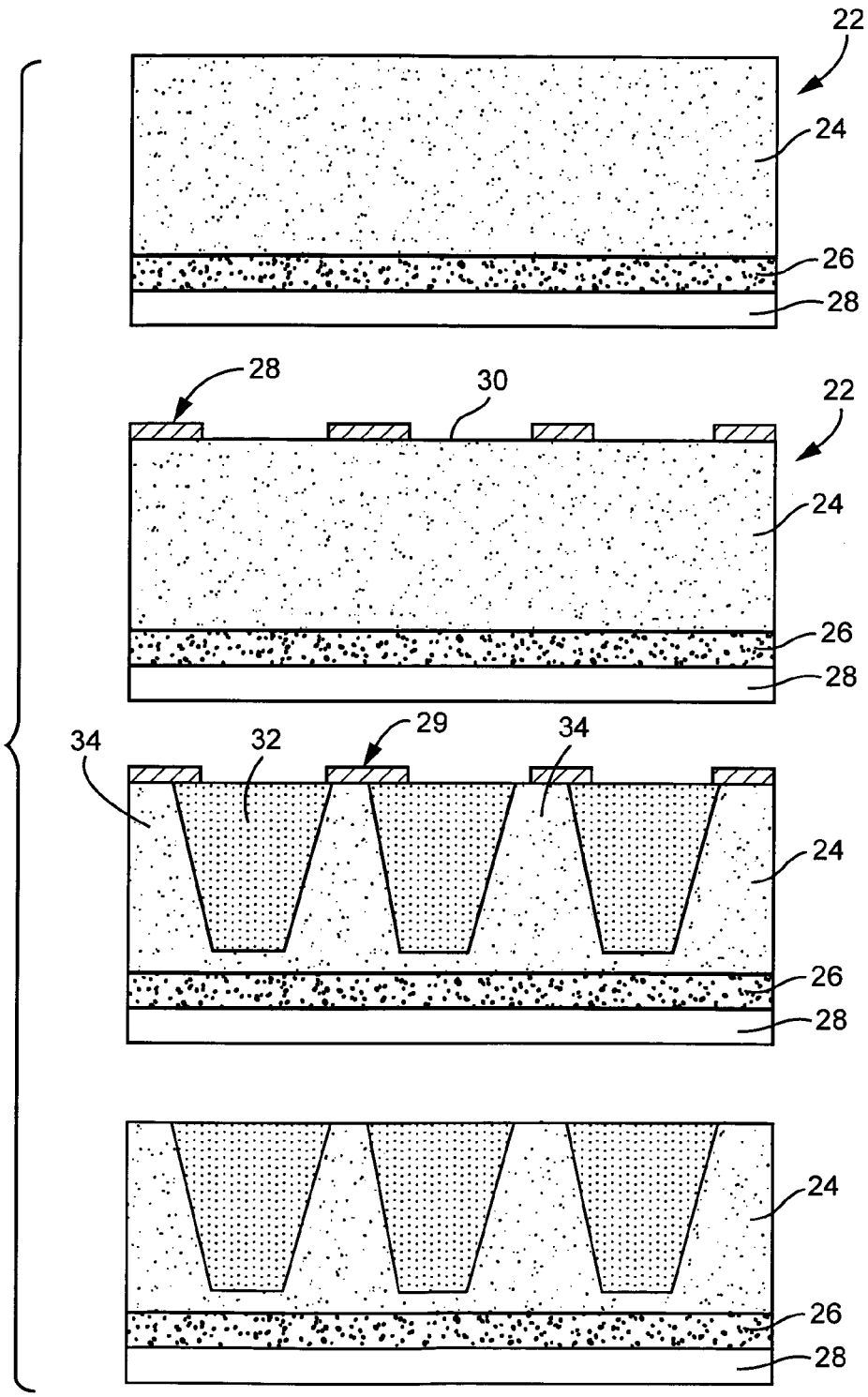
FIG. 2 is a flow diagram illustrating a series of method steps employed to manufacture a support electrode in accordance with the invention.

FIG. 2 illustrates a fabrication method for a support electrode, preferably the anode, in accordance with the exemplary embodiment of this invention. Specifically, the anode 22 is a graded anode similar to anode 12 including a relatively thick electrically conductive layer 24 and a relatively thin and electrically non-conductive layer 26. An electrolyte 28 is also shown, underlying the thin layer 26. The initial fabrication step reflected in FIG. 2 may be carried out with any suitable known process, such as tape casting, calendaring, dry pressing, etc. or as described in the '521 patent. The support electrode or anode 22 has considerable thickness to provide sufficient mechanical strength and cell flatness. The composition and porosity of the graded layers 24, 26 may also be similar to anode 12.

Figure 3:
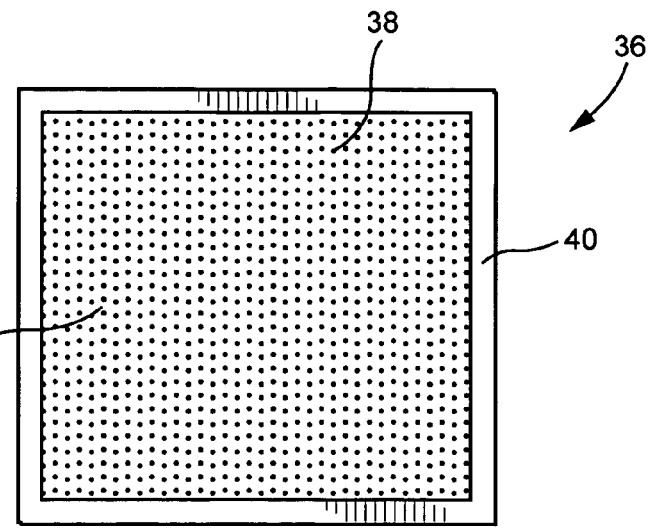
FIG. 3 is a plan view of a support electrode (anode) pattern in accordance with a first exemplary embodiment of the invention.
Figure 4:
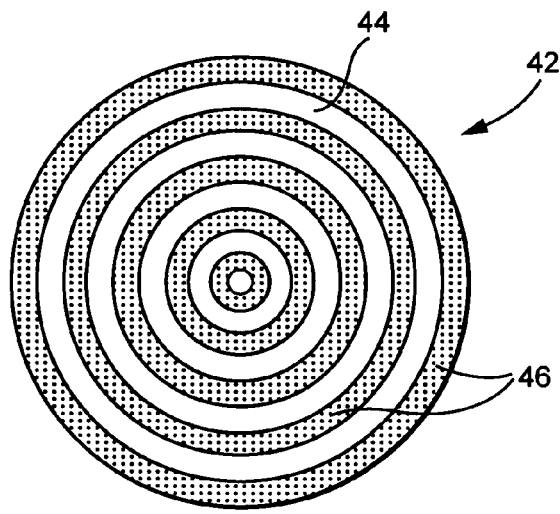
FIG. 4 is a plan view of a support electrode (anode) pattern in accordance with a second exemplary embodiment of the invention.
Figure 5:
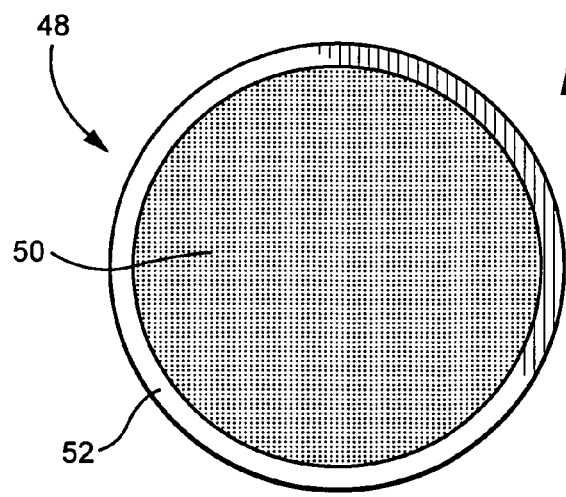
FIG. 5 is a plan view of a support electrode (anode) pattern in accordance with a third exemplary embodiment of the invention.

After sintering, a mask 29 with desired features is applied to the outer surface 30 of the support anode. At least one of the electrode components such as the electrically conductive phase, e.g., NiO, in the unmasked areas can be leached or etched out with chemical and/or plasma etching or other known methods, resulting in a skeleton having an ion conducting phase or empty spaces where both NiO and zirconia are etched out, and an enhanced mass transport pattern or path 32 with increased porosity. The electrically conductive path 34 under the mask area remains intact to provide adequate electronic conduction. The mask pattern can be designed to optimize the benefit of porosity, mechanical strength and electrical conduction, as well as to match flow field and interconnect configurations. FIGS. 3, 4, and 5 illustrate examples of patterns achievable with the masking process described herein.

Thus, FIG. 3 illustrates a support anode 36 with a relatively open and regular pattern of leached or etched areas 38 of increased porosity, i.e., where the NiO (or both NiO and zirconia) has been removed within a border 40 comprised of NiO and YSZ. Areas 38 can be round, square, oval, diamond-shaped, polyhedron-shaped, etc. and the depth or degree of penetration of the leached or etched areas 38 may vary as desired.

In FIG. 4, a round support anode 42 is shown to include a pattern of concentric rings or circular areas 44 where NiO (or both NiO and zirconia) has been removed to increase porosity in these areas. Adjacent circular areas 46 contain both NiO and YSZ. The depth or degree of penetration of the leached or etched area 44 may vary as desired.

FIG. 5 illustrates a round support anode 48 where the masked pattern 50 is similar to that shown in FIG. 3 but in a much finer grid of conductive and non-conductive areas. Border area 52 can remain conductive, comprising both NiO and YSZ through the thickness of the layer; or it can be etched out, compromising the YSZ skeleton.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of fabricating a support electrode for a solid oxide fuel cell comprising:

(a) providing a solid support electrode having an outer surface, said solid electrode comprising an electrically non-conductive material and an electrically conductive material;

(b) applying a mask over said outer surface to create a desired unmasked pattern on said top surface;

(c) removing a desired amount of material(s) from said unmasked pattern to a predetermined depth of said support electrode; and (d) removing the mask.

2. The method of claim 1 wherein said electrically conductive and non-conductive materials comprise nickel oxide and zirconia oxide, respectively.

3. The method of claim 1 wherein said support electrode comprises an upper layer incorporating said electrically conductive material and a lower layer incorporating said electrically non-conductive material in overlying relationship, the upper layer having the same or different porosity than said lower layer.

4. The method of claim 2 wherein said upper layer is thicker than said lower layer.

5. The method of claim 3 wherein steps (b) and (c) are applied only to said upper layer.

6. The method of claim 1 wherein, in step (b), said unmasked pattern comprises a regular pattern of polyhedrons.

7. The method of claim 1 wherein step (c) is carried out by chemical etching or physical etching.

8. The method of claim 2 wherein said support electrode comprises an upper layer incorporating said electrically conductive material and a lower layer incorporating said electrically non-conductive material in overlying relationship, the upper layer having the same or different porosity than said lower layer.

9. A method of fabricating a support electrode for a solid oxide fuel cell comprising:

(a) providing a solid support electrode having a first electrically conductive layer with an outer surface and a second electrically non-conductive layer underlying said first electrically conductive layer, said first layer being thicker than said second layer;

(b) applying a mask over said upper surface to create a desired unmasked pattern on said top surface;

(c) removing a desired amount of material(s) from said unmasked pattern to a predetermined depth of said first electrically conductive layer of said support electrode; and (d) removing the mask.

10. The method of claim 9 wherein said conductive and non-conductive materials comprise nickel oxide and zirconia oxide, respectively.

11. The method of claim 9 wherein, in step (b), said unmasked pattern comprises a regular pattern of polyhedrons.

12. The method of claim 9 wherein, in step (b), the mask is configured to create a regular pattern of unmasked features having shapes chosen from the group consisting of round, oval, square, diamond and polyhedron.

13. The method of claim 9 wherein step (c) is carried out by chemical etching and/or physical etching.

* * * * *